United States Patent
Alve et al.

(10) Patent No.: US 7,698,568 B2
(45) Date of Patent: *Apr. 13, 2010

(54) SYSTEM AND METHOD FOR USING DRM TO CONTROL CONDITIONAL ACCESS TO BROADBAND DIGITAL CONTENT

(75) Inventors: Jukka Alve, Helsinki (FI); Ari Ikonen, Raisio (FI); Mauri Kangas, Paimio (FI); Tapani Heikkilä, Espoo (FI)

(73) Assignee: Nokia Corporation, Espoo (FI)

( * ) Notice: Subject to any disclaimer, the term of this patent is extended or adjusted under 35 U.S.C. 154(b) by 1012 days.

This patent is subject to a terminal disclaimer.

(21) Appl. No.: 10/939,078

(22) Filed: Sep. 9, 2004

(65) Prior Publication Data

US 2005/0100167 A1    May 12, 2005

Related U.S. Application Data

(63) Continuation-in-part of application No. 10/705,449, filed on Nov. 11, 2003.

(51) Int. Cl.
*G06F 21/00* (2006.01)
*H04L 9/32* (2006.01)
*H04N 7/167* (2006.01)

(52) U.S. Cl. .................. 713/189; 713/171; 713/172; 380/200; 380/270; 380/284; 726/26

(58) Field of Classification Search ........... 380/281, 380/200, 201, 270, 271, 284; 713/171, 172, 713/189; 726/26, 31
See application file for complete search history.

(56) References Cited

U.S. PATENT DOCUMENTS

| | | | |
|---|---|---|---|
| 5,901,339 A | 5/1999 | Saito | |
| 6,584,199 B1 * | 6/2003 | Kim et al. | 380/203 |
| 2002/0066100 A1 * | 5/2002 | Hoang | 725/39 |
| 2002/0137496 A1 | 9/2002 | Nagaoka et al. | |
| 2002/0141491 A1 * | 10/2002 | Corts et al. | 375/216 |

(Continued)

FOREIGN PATENT DOCUMENTS

DE    4424380 A1    7/1994

(Continued)

OTHER PUBLICATIONS

DVB, Digital Video Broadcasting. Transmission System for Handheld Terminals (DVB H) DVB Document A081, Jun. 2004.*

(Continued)

*Primary Examiner*—Kimyen Vu
*Assistant Examiner*—Randal D Moran
(74) *Attorney, Agent, or Firm*—Locke Lord Bissell & Liddell LLP

(57) ABSTRACT

A system and method is disclosed for providing DRM in a broadcast environment. In accordance with the embodiment, a DRM system distributes encrypted service keys over the mobile telephone network to a mobile terminal. The mobile terminal receives the encrypted service key and uses it to decrypt encrypted content keys received from a DVB set top box. The decrypted content keys are sent to the set box over local link where they are used to decrypt encrypted broadcast content. A power management technique for mobile receivers is also disclosed that enables the receiver hardware to power off during a portion of the rendering process.

15 Claims, 3 Drawing Sheets

U.S. PATENT DOCUMENTS

| | | | |
|---|---|---|---|
| 2002/0172368 | A1 | 11/2002 | Peterka et al. |
| 2002/0174366 | A1 | 11/2002 | Peterka et al. |
| 2003/0005435 | A1 | 1/2003 | Nelger et al. |
| 2003/0152107 | A1 | 8/2003 | Pekonen |
| 2003/0161305 | A1 | 8/2003 | Hakkarainen et al. |
| 2003/0162543 | A1 | 8/2003 | Auranen et al. |
| 2003/0166392 | A1 | 9/2003 | Laiho et al. |
| 2003/0200548 | A1 | 10/2003 | Baran et al. |
| 2004/0001488 | A1 | 1/2004 | Harri |
| 2004/0047311 | A1 | 3/2004 | Pekonen |
| 2004/0055011 | A1 | 3/2004 | Bae et al. |
| 2004/0056985 | A1 | 3/2004 | Seong |
| 2004/0120285 | A1 | 6/2004 | Paila et al. |
| 2004/0205333 | A1 | 10/2004 | Bjorkengren |
| 2005/0091683 | A1* | 4/2005 | Sheynman et al. ............ 725/34 |
| 2005/0259813 | A1* | 11/2005 | Wasilewski et al. ........... 380/28 |
| 2005/0278787 | A1* | 12/2005 | Naslund et al. ............... 726/26 |

FOREIGN PATENT DOCUMENTS

| | | |
|---|---|---|
| DE | 19846452 A1 | 12/1999 |
| EP | 1150506 A2 | 10/2001 |
| EP | 1213842 A1 | 12/2002 |
| EP | 1 427 208 A1 | 6/2004 |
| GB | 2334 125 A | 11/1999 |
| JP | 2001-345766 | 12/2001 |
| JP | 2002-064479 | 2/2002 |
| JP | 2003-051816 | 2/2003 |
| WO | WO 95/17796 | 6/1995 |
| WO | WO 98/43426 | 10/1998 |
| WO | WO 98/56181 | 12/1998 |
| WO | WO 01/37567 A1 | 5/2001 |
| WO | WO 01/67761 A1 | 9/2001 |
| WO | WO 03/067885 A1 | 8/2003 |

OTHER PUBLICATIONS

PCT International Search Report, International Application No. PCT/IB04/03687, Date of Completion of Search—Aug. 26, 2005, Sheets 1 and 2.

http://www.dvb.org/documents/white-papers/a081.dEN302304.sb1333.tm3037.tm-h0202r4.pdf Transmission System for Handheld Terminals (DVB H) DVB Document A081—Jun. 2004—Printed on Dec. 30, 2004.

http://www.dvb.org/documents/a080.pdf IP Datacast Baseline Specification; Specification of Interface I_MT DBV Document A080—Apr. 2004 Printed on Dec. 30, 2004.

http://www.dvb.org/documents/a079.pdf IP Datacast Baseline Specification; PSI/SI Guidelines for IPDC DVB-T/H Systems (DVB Doc. A079)—Apr. 2004 Printed on Dec. 30, 2004.

http://www.dvb.org/documents/white-papers/tm2967.sb1299.cm0503r4.pdf Commercial Requirements—IP Datacast in DVB-H—Oct. 25, 2003—Printed on Dec. 30, 2004.

http://www.dvb.org/documents//DVB-H Outline.pdf DVB-H Outline (AHG DVB TM-H)—Sep. 12, 2003—Printed on Dec. 30, 2004.

http://www.dvb.org/documents/white-papers/tm2466r4.pdf The Convergence of Broadcast & Telecommunications Platforms—Jun. 2, 2002—Printed on Dec. 30, 2004.

http://www.dvb.org/index.php?id=10&nid=79rl DVB-H Trials Planned for Australia; http://www.dvb.org/index.php?id=10&nid=79rl—Printed on Dec. 30, 2004.

http://www.dvb.org/documents/white-papers/wp07.DVB-H.final.pdf IP broadcasting to handheld devices based on DVB-T—Printed on Dec. 30, 2004.

http://www.dvb.org/documents/white-papers/tm3095r2 IPDC in DVB-H: Technical Requirements—Printed on Dec. 30, 2004.

http://www.dvb.org/documents/white-papers/tm3132r2.cbmsv.1.0.IPDC CfT.pdf Call for Technologies—Jul. 2, 2004—Printed on Dec. 30, 2004.

Open Mobile Alliance, Ltd.—DRM Content Format Version 1.0—Sep. 13, 2002.

Open Mobil Alliance, Ltd.—Rights Expression Language Version 1.0—Sep. 13, 2002.

Open Mobile Alliance, Ltd.—Digital Rights Management Version 1.0—Sep. 5, 2002.

http://www.dvb.org/index.php?id=48&nid=47rI, "Finnish companies join forces for a commercial pilot for mobile broadcasting services", DVB The Standard of the Digital World, Dec. 30, 2004, 4 pgs.

"Rights Management Solutions - Protecting Content Within and Beyond the Enterprise", Documentum Technical White Paper, Sep. 3, 2002, 19 pages.

"WAP Push Architectural Overview Version Jul. 3, 2001 -- Wireless Application Protocol WAP-250-PushArchOverview-20010703-a," Jul. 3, 2001, 24 pages.

* cited by examiner

SYSTEM AND METHOD FOR USING DRM TO CONTROL CONDITIONAL ACCESS TO BROADBAND DIGITAL CONTENT

This is a continuation-in-part of application Ser. No. 10/705,449, filed Nov. 11, 2003.

FIELD OF THE INVENTION

This invention generally relates to the protected transmission and use of IP datacast content. More specifically it relates to secure broadband digital content delivery and rights management using a mobile terminal.

BACKGROUND OF THE INVENTION

DVB provides a standard for the distribution of digital broadcast video content. One of the issues concerning the adoption of DVB is that the pristine digital content provided by the standard could potentially be recorded and distributed without loss of quality and without the content owner's consent. To avoid unauthorized distribution the DVB standard includes a mechanism for encrypting the distributed content prior to transmission. DVB, however, does not dictate a digital rights management (DRM) scheme or key delivery standard. These two elements ensure the secure transmission and conditional access to the protected content. DVB leaves this aspect of content protection to the development of proprietary DRM systems.

In any rights managements system encryption of the delivered content is relatively simple. What is more difficult is distributing conditional access to the rights needed to decrypt and use the distributed information. Rights embody what an end user is allowed to do with the encrypted content, for example, play the content for a certain period or copy the content a limited number of times. DRM accomplishes this conditional access to the content by wrapping the keys required to decrypt the content into a tightly controlled system where the rights themselves cannot be freely copied or distributed, see Published U.S. Patent Application No. 2003-0076955-A1. The successful control of these rights requires that they be individualized to restrict distribution of the rights beyond a particular authorized end user.

Current DVB DRM solutions transmit these rights as vouchers sent along with the same broadcast that carries the DVB transmission. This approach can be very wasteful of bandwidth because each user needs to receive an individualized rights voucher. As the number of vouchers grows the broadcast link's bandwidth, which must also carry the digital content, will be needlessly wasted. This method of voucher transmission is particularly wasteful because every user that receives the broadcast receives not only the voucher intended for that user but also the vouchers intended for every other user.

Other approaches to provide DRM control utilizing specialized equipment, such as set top boxes with smart cards and modems, to distribute rights vouchers through different communications links, for example over telephone lines. However, the specialized equipment required to carry out the rights delivery prevents over-the-air broadcasters from efficiently controlling an end user's equipment the way a cable distributor might. The problem is that while the over-the-air broadcasters would like to develop additional broadcast pay systems, they cannot without first developing a unified hardware infrastructure for the end users, including DRM infrastructure (hardware and software) and billing mechanisms. The investment required to create a system would be substantial for any one broadcast channel. Additionally end users would be unlikely to invest in or acquire new equipment for a system that worked for one only channel.

SUMMARY OF THE INVENTION

The above identified problems are solved and a technical advance is achieved in the art by providing a system and method for using DRM to control conditional access to DVB content.

An exemplary embodiment of the present invention includes a DRM system that encrypts a DVB service key and creates rights vouchers describing the rights associated with the use of the DVB service key. A rights voucher and the encrypted service key are sent to a mobile terminal, which is programmed to decrypt the service key in accordance with the rights articulated in the rights voucher. A DVB display device receives content encrypted with a content key and also receives a version of the content key that has been encrypted with the service key. The DVB display device sends the encrypted content key to the mobile terminal. The mobile terminal decrypts the content key with the service key in accordance with the rights defined in the rights voucher. The mobile terminal sends the decrypted content key to the DVB display device where it is used to decrypt the encrypted content.

In a further exemplary embodiment of the present invention, the DRM system sends the mobile terminal an executable application. The mobile terminal then runs the application which governs the service and content key decryption and enforces the assigned rights.

In a further exemplary embodiment of the present invention, the DRM system and the mobile terminal both operate according to the OMA DRM standard to protect the service key, define the rights voucher, and to enforce the granted rights on the mobile terminal.

In a further embodiment of the present invention the mobile terminal connects to the DVB display device via Bluetooth.

In a further embodiment of the present invention the mobile telephone billing system is used to bill for the use of DVB content.

Other and further aspects of the invention will become apparent during the course of the following description and by reference to the attached drawings.

DETAILED DESCRIPTION

The system and method of the present invention provide an efficient and secure method for transmitting DRM rights in a DVB environment. The present invention has the advantage of using a separate distribution path to allow transmission and rights control to occur in a protected manner without needlessly wasting broadcast transmission bandwidth. Additionally, in a particularly advantageous embodiment the present invention employs the mobile telephone infrastructure and established mobile DRM standards for ready made billing and content control.

Figure 1:
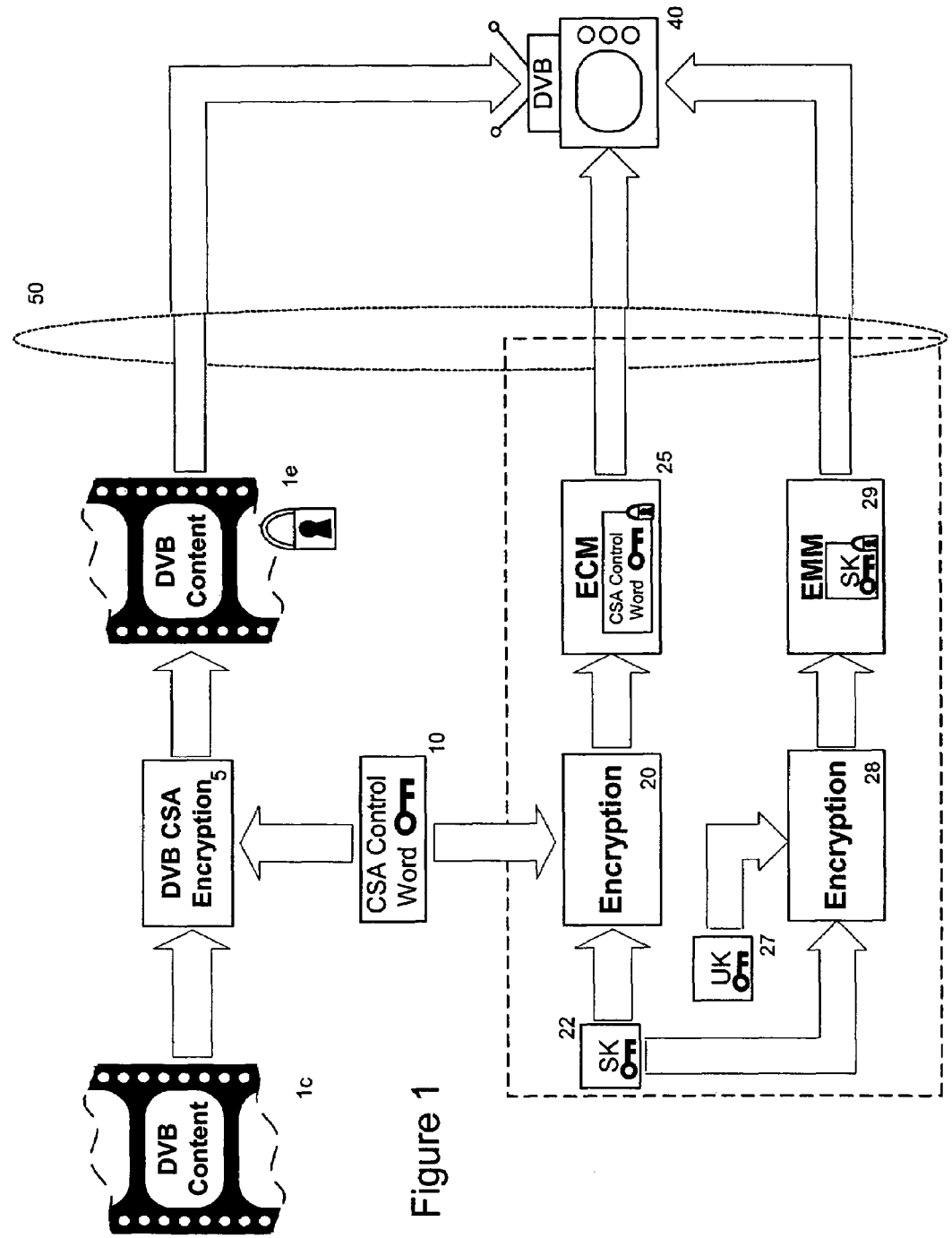
FIG. 1 is a block diagram showing the delivery of DVB encrypted content.

FIG. 1 presents an overview of the DVB content encryption and delivery scheme. Clear, i.e. unencrypted, DVB content 1c is first encrypted in accordance with the DVB common scrambling algorithm (DVB CSA 5). DVB CSA 5 takes the clear DVB content 1c and a random CSA control word 10 as input. DVB CSA 5 then employs a symmetric encryption algorithm to generate the encrypted DVB content 1e. The CSA control word 10 must later be used by a decryption algorithm to decrypt the encrypted DVB content 1e and recover the usable clear DVB content. The CSA control word can, therefore, be thought of as the key to the distributed encrypted content. The encrypted DVB content 1e is now safe to freely broadcast over the airways 50 to DVB end users 40. With regard to the end users, the figures only show one symbol to designate end users 40, however, it should be understood that any number of end users might receive the broadcasted content. In addition, the identified end user 40 represents a number of hardware and software structures that perform DVB functions, e.g. receiving and decrypting DVB content and messages. The end user structures can be embodied by any suitable known equipment, such as TVs, tuners, or set top boxes programmed to operate in accordance with the DVB standard and the disclosed system.

The process described thus far is defined by the DVB standard and therefore should be consistent among various DVB implementations. However, the encrypted DVB content received by the end users 40 will only be useful if it can be decrypted. To do so, the end user 40 will require a copy of the CSA control word 10. The DVB standard, however, does not dictate how to securely transmit control words to end users. It also does not dictate how to ensure that the control words, once distributed, are only used in accordance with the rights dictated by the content providers. A complete DRM system must, therefore, both protect the secrecy of the control words in transit and limit their use by the end users in accordance with the rights granted by the content providers. A general approach for carrying out this proprietary aspect of the DVB system is shown in the dashed rectangle in FIG. 1.

First, the CSA control word 10 is encrypted 20 with a service key (SK 22). The service key is used to encrypt all CSA control words associated with a particular DVB service, e.g. a premium channel or a pay-per-view event. Different services, however, would most likely use different keys. The encrypted CSA control word is added to an entitlement control message (ECM 25). In addition to the encrypted CSA control word, the ECM 20 might also include header information or other relevant data. The ECMs are then transmitted over the broadcast network to the end users 40.

The encrypted CSA control word contained in the ECM must be decrypted before it can, in turn, be used to decrypt the encrypted DVB content. Accordingly, the service key SK 22 must be transmitted to the end user. To do so securely, the service key is encrypted 28 with a user key (UK 27) that is specific to a particular end user. Typically the UK is stored in a protected smart card in the end users set top box. The encrypted SK is then used to generate an entitlement management message EMM 29. The EMM might also include header or rights information. The transmitted rights information, for example, would dictate how the end user can use the protected content.

Unlike the previous encryption steps, the user key does not need to be transmitted to the end users 40 because the end users' hardware is pre-programmed to decrypt data encrypted with the users' UK. A number of procedures can be employed to ensure the secrecy and usability of the UK. For example, the end users' hardware can be pre-programmed with a shared secret known by the DVB system. Or, a public key cryptography system can be employed to encrypt the SK without ever knowing the end users' UK. In either instance, upon receipt of EMM the end user decrypts the service key which in turn is used to decrypt the CSA control word which ultimately is used to decrypt the broadcast content.

Figure 2:
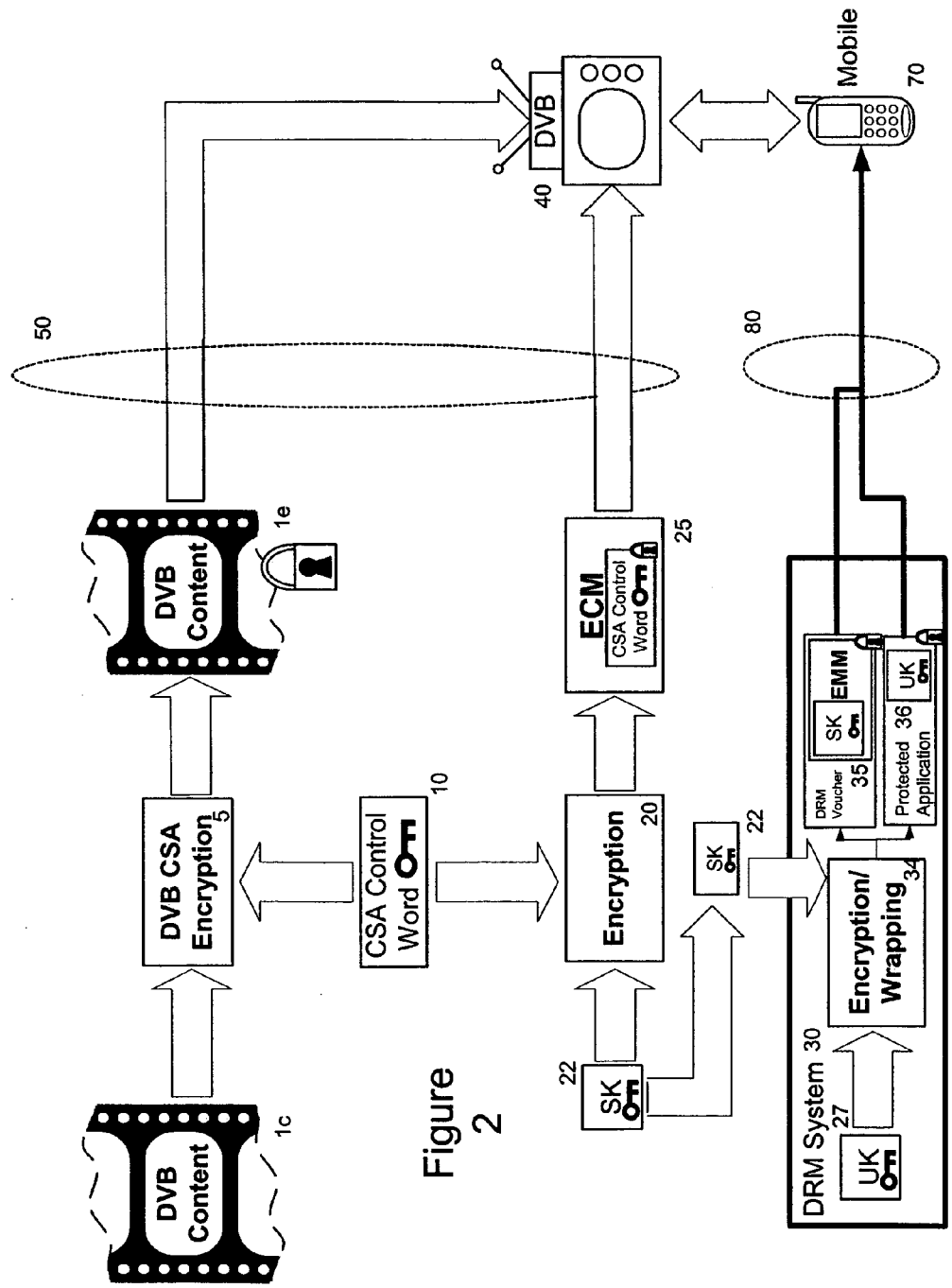
FIG. 2 is a block diagram showing an exemplary embodiment of the present invention disclosing a DRM system for DVB using a mobile terminal.

As shown in FIG. 2, the general approach for transmission of DVB content is modified to employ a mobile terminal 70. The delivery of the encrypted DVB content 1e and encrypted control words within ECMs 25 is done as shown in FIG. 1. The introduction of a mobile terminal, however, allows the system of FIG. 2 to off-load DRM implementation and service requirements from the DVB broadcaster to the mobile telephone/data network.

The content provider, i.e. the broadcaster, delivers the SK together with other data relating to the content, to the DRM system. In practice this could be accomplished by a server at the content provider generating and sending the SK via any known method of computer to computer communication.

In one embodiment, the SK is sent already encrypted by the UK in an EMM. The DRM system would add the particular formatting and rights information needed and then send the EMM to the Mobile terminal.

In an alternative embodiment, as shown in FIG. 2, the broadcaster could provide the DRM System 30 with the SK prior to its encryption with a UK 27. This would limit the amount of data traffic between the DVB broadcaster and the DRM System 30 because the SK is generic to all users, while an encrypted EMM is user specific and must be generated for each end user requesting the service. These two examples demonstrate the fact that the various aspects of the DVB encryption/broadcast and the DRM System can be split up between the DVB and DRM service providers in any number of ways, including a system where the DVB provider also performs the DRM services.

The rights enforcement supplied by the DRM System can be performed with any known DRM technique. For example, the mobile terminals participating in the system can be designed from the ground up to include a UK and DRM software and/or hardware that protects the UK. The software and/or hardware would ensure that the mobile terminal only uses the UK in accordance with instructions provided by the DRM system. In this embodiment, the DRM system would either need to know the UK, i.e. a shared secret, or know how to encrypt content so that the UK can decrypt it, i.e. public key cryptography.

Returning to the embodiment of FIG. 2A, once the DRM System 30 receives the SK 22 it provides DRM protection for the SK and distributes it to the end users over the mobile telephone network. The DRM System can be embodied by a computer or a group of computers that are programmed to perform the disclosed operations and are connected to the mobile telephone network such that they can transmit data to mobile terminals.

The DRM System may also have data stored on the user, such as e.g. identification data (name, address, phone number), data relating to his DRM compliant devices, data relating to content subscription, data relating to billing etc. The DRM System may communicate with the mobile network operator, e.g. for billing purposes.

In the present embodiment one of the functions of the DRM System is to provide the DRM infrastructure to the mobile terminal 70. As shown in FIG. 2, the DRM system provides the mobile terminal 70 with a Protected Application 36 containing the UK 27. The Protected Application runs on the mobile terminal and performs DRM operations, such as, e.g., key decryption and rights enforcement. The Protected Application can be programmed according to any know methods of providing protected computing. Moreover, once installed in the mobile terminal the Protected Application provides DRM enforcement for any number of EMMs sent by the system. This embodiment is particularly advantageous because it provides for the delivery of the UK. It can, therefore, both initiate a mobile terminal that has never participated in the particular DRM system, and refresh the UK on mobile terminals in the system to provide updated security.

In addition to providing the Protected Application, the DRM System must also be programmed to provide a protected SK, and rights dictating its use, to the mobile terminal. This is accomplished by encrypting/wrapping 34 the SK to create an EMM wrapped in a DRM Voucher 35, which dictates the usage rights for the SK. Accordingly, the computers embodying the DRM System 30 are programmed to wrap and encrypt 34, i.e. encapsulate, the EMM and other data into a DRM Voucher 35. The DRM System 30 communicates with mobile terminals through a mobile network 80 to deliver the DRM messages and objects, e.g. DRM Voucher and Protected Applications.

As a rights object, the DRM Voucher could also include protected rights definitions dictating the number and type of uses that can be performed on the content associated with the SK. The DRM Voucher may further comprise other data, e.g. data relating to the requested/ordered content and data relating to the billing or payment. The DRM Voucher may be expressed in a rights expression language, such as e.g. ODRL, or in an extensible markup language such as e.g. XML or in any derivatives thereof.

The function of the rights object, however, could be implemented in a less flexible way by pre-programming the rights into the system or the protected application. For example, the Protected Application could be programmed to only allow a certain set of rights, e.g. one play, for all EMMs it receives.

Turning now to the operation of the mobile terminal and the operations performed at the end user 40. As noted above, the end user 40 employs a means of receiving DVB encrypted content and providing output via a display. In the disclosed embodiment this operation is performed by a DVB set top box, however, the disclosed operations can be integrated into a TV or can be embodied by any hardware known in the art capable of performing the disclosed functions.

Figure 3:
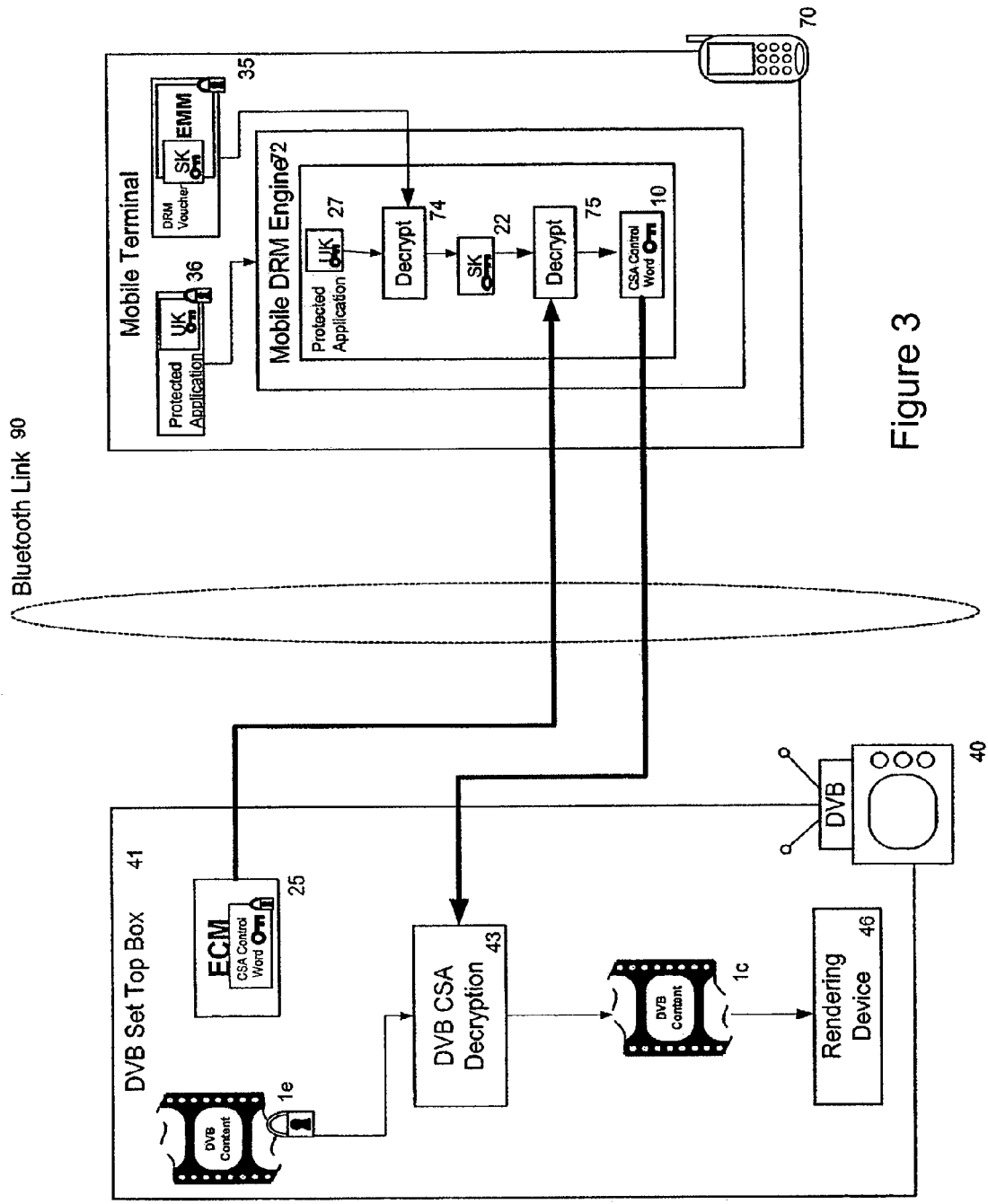
FIG. 3 is a block diagram showing an exemplary embodiment of the present invention disclosing the operation of and communication between a mobile terminal and a DVB set top box.

As shown in FIG. 3, the DVB set top box communicates with the mobile terminal over any know communication link, such as a wired connection or a wireless RF or infra red link. One advantageous embodiment would employ Bluetooth for the communications between the set top box and the mobile terminal because it is an established standard and provides a ready made secure connection between the set top box and the mobile terminal. As previously discussed, the mobile terminal 70 is simply hardware device connected to the mobile network and programmed to perform the disclosed functions of the DRM system.

The process begins with the end user ordering protected DRM content. Lists of available content can be set up for browsing on the television via the DVB network or set top box or the mobile terminal itself via its user interface. In the case where the user browses for content on the mobile terminal, the mobile terminal can connect to servers at the DRM system, or from other sources, to receive data describing the available content choices. Alternately, the available content can be browsed and ordered via the voice telephone network.

In any case, once the user has selected a particular piece of content, the DRM System 30 is notified and begins to push the required DRM vouchers and software to the mobile terminal 70. The use of the mobile terminal in the ordering process enables the DVB content provider to make use of the mobile terminal billing network to charge for the content. In other words, if a user orders a pay per view movie the charge for that movie can be simply added to the users mobile phone bill.

With the content ordered the process of using the content beings. As shown in FIG. 3, the set top box 41 receives, or has previously received and stored, the encrypted DVB content 1e and its associated ECMs 25. The set-top box, however, cannot use any of the encrypted DVB content 1e without the CSA control word contained in the ECM. However, the ECM must be decrypted with the appropriate service key to obtain the clear CSA control word. To do this the set top box 41 passes the ECM 25 to the mobile terminal 70 over the Bluetooth link 90. The Bluetooth link does not necessarily need to be protected at this stage because the ECM contains an encrypted CSA control word. Advantageously, many set top boxes already perform a similar function and send the received ECMs to a smart card for decryption. Thus, the set top boxes need only be redesigned to communicate with the mobile terminal instead of the smart card.

As described above, and shown in FIG. 3, the mobile terminal 70 has received the Protected Application 36 and the DRM Voucher 35 from DRM System 30. The process for decrypting the CSA control word is as follows, preferably, the mobile terminal has a Mobile DRM Engine 72, which is hardware and/or software designed to perform secure processing and is resistant to tampering by individuals attempting to thwart the applied DRM. The DRM Engine runs the Protected Application 36, which has secure access to the UK 27. The protected application takes the DRM Voucher 35 and ECM 25 as input.

The DRM will then determine if the rights expressed in the DRM voucher allow the requested use, e.g. playing of DVB Content. If the requested use is allowed, the Protected Application uses the UK to decrypt 74 the SK contained in the EMM. The decrypted SK is then used to decrypt the CSA Control Word contained in the ECM to produce a clear CSA Control Word 10. The clear CSA Control Word is then sent back over the Bluetooth link to the set top box. Preferably, the transmission of the clear, i.e. unencrypted, CSA Control Word to the set top box occurs over a secure Bluetooth Link. Bluetooth Link Secure connections provide ready made authentication, authorization, and encryption (ciphering of plain text).

Distributing the Protected Application to practice the DRM System is particularly advantageous because the Protected Application can be tailored for the end user's specific mobile terminal and/or set top box thereby ensuring compatible operation for users regardless of the equipment employed.

Upon receipt of the decrypted CSA Control Word 10 the DVB set top box uses the CSA Control Word to perform DVB CSA Decryption 43. This generates clear DVB content 1c that can then be output to display 46 for use. Display 46 is merely a generic representation for use of the content. In practice the content could be music, software, etc., which would each be used on an appropriate device.

In alternative embodiments, the Protected Application may have a period of validity as expressed in DRM Voucher and the Protected Application may be made inoperable after the validity expires or the Protected Application may even be discarded, overwritten or deleted wholly or in part. In one embodiment of the invention the Protected Application that has been made inoperable may be re-activated with a response message from the DRM system, wherein the reactivation message may be a DRM Voucher comprising another Protected Application.

Other embodiments could use the mobile phone network to receive location information from the network. The location of the mobile terminal can easily be determined down to cell level and the location data is available in the Visitor Location Register (VLR) in the network. The received location information may be used as part of the access control. For example, the DRM Voucher might contain geographic restrictions that can be applied using this feature.

Another advantageous embodiment would use the mobile terminal in connection with any near by device that receives DVB content. If a Bluetooth connection is used, the Bluetooth Service Discovery Protocol and Bluetooth pairing mechanism will provide a trust relationship that may be used for the necessary set top box identification. This functionality would allow a user to buy and use content at a friends house or other location.

In another advantageous embodiment, the DRM system can leverage the use of mobile terminals and implement the Open Mobile Alliance's (OMA) standard DRM infrastructure. The benefits of using OMA compliant mobile terminals to deliver EMMs and DRM rights are thus two fold. First, mobile terminals are a common piece of hardware owned by most individuals, therefore, the broadcaster can provide added services without deploying specialized hardware to all potential end users. Second, the use of mobile terminals also allows broadcasters to adopt standard mobile DRM systems like OMA thereby obviating the need to develop and maintain costly specialized systems. Both of these advantages lead to a system where an end users can employ standard equipment to obtain premium DVB content at the spur of the moment. This allows for a more marketable system compared to a system where users must plan ahead and obtain special equipment to view premium content.

In general, OMA defines a software and hardware standard for mobile terminals. The OMA DRM standard allows compliant devices to implement and participate in a rights management system, including securely transmitting protected content and an executable application, such as a Java applet. The OMA compliant mobile terminal will then run the application, which contains the required UK and other security procedures necessary to ensure the protection of the protected content. In the present invention the protected content is simply the SK and the CSA control word rather than the actual usable media. Additional detailed descriptions of the OMA DRM system are documented in OMA published documents including OMA, DRM Content Format Version 1.0; OMA, Digital Rights Management Version 1.0; and OMA Rights Expression Language Version 1.0, which are all available at www.openmobilealliance.com and are hereby incorporated by reference.

In the context of the present invention, the DRM System would create Protected Applications and DRM Vouchers in accordance with the OMA standard. And the mobile terminal would be designed and programmed to follow the OMA standard when running the OMA application and following the DRM vouchers.

As stated above, the disclosed invention can be embodied in any hardware capable of performing the disclosed operations. For example, in another embodiment all the end user functions of the disclosed invention can be embodied in a single mobile terminal with a receiving hardware device, a rendering hardware device and a memory device containing a software program to practice the disclosed procedures, such as, e.g., a mobile phone, laptop or personal digital assistant. Such devices are becoming increasingly popular sources of entertainment as enhancements to networks and portable devices allow richer and more varied content to the end user. For example, mobile telephone handsets with relatively large color screens are likely to become popular devices for viewing video broadcasts.

Using a mobile terminal to render broadcast content, however, presents some additional issues that require solutions. One of the most prominent concerns for any mobile device is available battery life. Receiving broadcast content is particularly battery intensive because the mobile terminal's receiving circuits must stay active during the entire broadcast. For example, the power consumption required for receiving the broadcast of a movie or television show might significantly reduce the device's available battery life.

An exemplary embodiment of present invention provides a solution to reduce battery use in broadcast situations. The solution involves providing broadcasts to mobile devices in time sliced and time compressed segments. In other words, if the broadcast link has sufficient bandwidth to send a segment of the broadcast content in less time than it would take to render the content contained in the segment, power can be saved because the content can be sent and then the receiver can be turned off while the content plays. For example, if a network can broadcast content at 3 megabits per second and the content renders at 300 kilobits per second, the receiver at the mobile device only needs to turn on for a second to receive ten seconds worth of content. The receiver can then turn off for 9 seconds while the content renders, thereby, reducing the power consumption by 90%. The broadcast of live content under this technique would require a slight transmission delay consistent with the employed segment length. For example, if the broadcaster chose to send the content in one minute segments it would have to buffer one minute's worth of content before beginning the transmission of the first segment. Accordingly, the broadcast would be delayed by about a minute.

This time slice technique also has the advantage of easing the transition between cells in a cellular environment where the mobile device is moving from cell to cell. As the mobile terminal moves from cell to cell it must choose the optimal time to switch its connection from one cell to the next. If the mobile terminal was receiving the broadcast in real time the handoff to the next cell might cause some defect in the receipt of the broadcast transmission. It would at least require very careful judgment to pick the optimal time for the switch. In contrast, using the disclosed time sliced technique the mobile terminal can intermittently use its receiver to look for other cells. Then, by virtue of the extended time between segment transmissions, a larger time window is available to determine the optimal cell transfer time.

To carry out the described technique, the mobile terminal can be provided with a memory device having executable software for performing the disclosed operations. For the disclosed technique to be successful, the mobile terminal must be provided with the proper timing to turn off and turn on its receiver during segment receipt. The initial determination to turn the receiver on can be generated from a number of sources, typically it will be at the request of the device user for a particular piece of content. The device can then turn off after receiving the first segment. Once off, then next determination is when to turn the receiver back on, which can be accomplished in a number of ways. For example, the segment transmission gap could be preset system wide as part of the protocol employed. In other words, all transmission segments could occur at predetermined intervals. Alternately, the mobile terminal could automatically turn on its receiver when the current segment is about finish its rendering phase and wait for the next segment, e.g., when the currently rendering segment reaches 95% completion the receiver can turn on. Alternately, each segment could include data indicating when the next segment will be broadcast. Identifying the broadcast time of the next segment through data in the previous segment, is particularly advantageous because it allows variable segment size and the determination of the timing of the next segment without rendering the current segment.

The many features and advantages of the present invention are apparent from the detailed specification, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact instruction and operation illustrated and described herein. Accordingly, all suitable modifications and equivalents that may be resorted to are intended to fall within the scope of the claims.

The invention claimed is:

1. A method for protecting broadcast digital content comprising:
    encrypting digital content with a first key;
    encrypting the first key with a second key;
    broadcasting the encrypted first key;
    broadcasting the encrypted digital content in a number of segments;
    protecting the second key and assigning rights to the second key;
    transmitting, via a protected voucher, the protected second key and the assigned rights to a mobile terminal over at least one of a number of networks; and
    transmitting a protected executable application to the mobile terminal, wherein the protected executable application governs key decryption, wherein the protected executable application enforces the assigned rights, and wherein the second key decrypts the protected executable application.

2. The method of claim 1 wherein each segment is broadcast in less time than is required to render the encrypted digital content contained in the segment.

3. The method of claim 1 wherein transmitting the protected second key and the assigned rights to a mobile terminal over a mobile network.

4. A method for protecting broadcast digital content comprising:
    encrypting digital content with a first key;
    encrypting the first key with a second key;
    broadcasting the encrypted digital content in a number of segments, wherein each segment is broadcast in less time than is required to render the encrypted digital content contained in the segment;
    protecting the second key and assigning rights to the second key;
    transmitting, via a protected voucher, the protected second key and the assigned rights to a mobile terminal over a mobile network; and
    transmitting a protected executable application to the mobile terminal, wherein the protected executable application governs key decryption, wherein the protected executable application enforces the assigned rights, and wherein the second key decrypts the protected executable application.

5. A method for viewing protected digital content comprising:
    receiving and buffering a broadcasted segment of encrypted digital content and an encrypted first key with a broadcast receiver of a mobile terminal and turning off the broadcast receiver after the segment is received;
    receiving, via a protected voucher, a protected second key and assigned rights at the mobile terminal over a mobile network;
    receiving a protected executable application, wherein the protected executable application governs key decryption, wherein the protected executable application enforces the assigned rights, and wherein the second key decrypts the protected executable application;
    decrypting the encrypted first key with the protected second key in accordance with the assigned rights;
    decrypting the broadcast segment of encrypted digital content with the decrypted first key;
    rendering the digital content; and
    turning the broadcast receiver back on after a predetermined period.

6. The method according to claim 5 wherein the predetermined period is dictated by a parameter of the broadcasted segment.

7. The method of claim 5 wherein the predetermined period is programmed into the mobile terminal.

8. The method of claim 5 wherein the predetermined period is determined by the amount of time the digital content takes to render.

9. The method of claim 5 where the digital content is a DVB video program.

10. A system for protecting digital video broadcast content comprising:
    a mobile network;
    a computer connected to the mobile network;
    a mobile terminal connected to the mobile network;
    wherein the mobile terminal comprises a content receiving device and content rendering device;
    wherein the content receiving device is programmed to receive one-way content transmissions containing a plurality of segments of encrypted digital content and at least one encrypted first key;
    wherein the computer is programmed to protect a second key, create assigned rights identifying allowed uses of the second key, and send the protected second key, the assigned rights, and a protected executable application to the mobile terminal over the mobile network, wherein the protected executable application governs key decryption, wherein the protected executable application enforces the assigned rights, and wherein the protected second key and the assigned rights are sent via a protected voucher;
    wherein the mobile terminal is programmed to use the protected second key in accordance with the assigned rights to decrypt the encrypted first key, and the content receiving device is further programmed to decrypt the encrypted digital content with the decrypted first key;
    wherein the mobile terminal is programmed to turn off the content reception device after receiving a first segment of encrypted digital content, and then turning the content reception device on after a predetermined period of time to receive a second segment of encrypted digital content;
    wherein the rendering device renders the decrypted digital content; and
    wherein the second key decrypts the protected executable application.

11. A system for displaying protected digital content comprising:
    a mobile network;
    a mobile terminal connected to the mobile network;

the mobile terminal comprising a content receiving device capable of receiving broadcast content and a rendering device capable of rendering content;

wherein the content receiving device is programmed to receive broadcast content transmissions containing segments of encrypted digital content, at least one encrypted first key, and a protected executable application, wherein the protected executable application governs key decryption, wherein the protected executable application enforces assigned rights, and wherein the content receiving device is further programmed to send the encrypted first key to the mobile terminal over a short range network;

wherein the mobile terminal is programmed to use a protected second key in accordance with the assigned rights to decrypt the encrypted first key, and the content receiving device is further programmed to decrypt the encrypted digital content with the decrypted first key, wherein the mobile terminal receives the protected second key and the assigned rights via a protected voucher;

wherein the mobile terminal is programmed to turn off the content reception device after receiving a first segment of encrypted digital content, and then turning the content reception device on after a predetermined period of time to receive a second segment of encrypted digital content;

wherein the rendering device renders the decrypted digital content; and wherein the second key decrypts the protected executable application.

12. The system of claim 11 wherein the encrypted digital content is a DVB transmission and the rendering device is a screen and at least one speaker.

13. A system for displaying protected digital content comprising:

a mobile terminal;

the mobile terminal comprising a content receiving device capable of receiving broadcast content and a rendering device capable of rendering content;

wherein the content receiving device is programmed to receive broadcast content transmissions containing segments of encrypted digital content, at least one encrypted first key, and a protected executable application, wherein the protected executable application governs key decryption, wherein the protected executable application enforces assigned rights, and wherein the content receiving device is further programmed to communicate the encrypted first key to the mobile terminal;

wherein the mobile terminal is programmed to use a protected second key in accordance with the assigned rights to decrypt the encrypted first key, and the content receiving device is further programmed to decrypt the encrypted digital content with the decrypted first key, wherein the mobile terminal receives the protected second key and the assigned rights in a protected voucher;

wherein the mobile terminal is programmed to turn off the content reception device after receiving a first segment of encrypted digital content, and then turning the content reception device on after a predetermined period of time to receive a second segment of encrypted digital content;

wherein at least one of the first keys is decrypted and then the encrypted digital content is decrypted and the rendering device renders the decrypted digital content; and wherein the second key decrypts the protected executable application.

14. An apparatus comprising:

a memory having program code stored therein; and a processor disposed in communication with the memory for carrying out instructions in accordance with the stored program code;

wherein the processor, in accordance with the program code, is configured to:

receive and buffer a broadcasted segment of encrypted digital content and an encrypted first key with a broadcast receiver of the apparatus and turn off the broadcast receiver after the segment is received;

receive, via a protected voucher, a protected second key and assigned rights at the apparatus over a mobile network;

receive a protected executable application, wherein the second key decrypts the protected executable application, wherein the protected executable application governs key decryption, and wherein the protected executable application enforces the assigned rights;

decrypt the encrypted first key with the protected second key in accordance with the assigned rights;

decrypt the broadcast segment of encrypted digital content with the decrypted first key;

render the digital content; and turn the broadcast receiver back on after a predetermined period.

15. An article of manufacture comprising a computer readable medium containing program code that when executed causes an apparatus to perform:

receiving and buffering a broadcasted segment of encrypted digital content and an encrypted first key with a broadcast receiver of the apparatus and turning off the broadcast receiver after the segment is received;

receiving, via a protected voucher, a protected second key and assigned rights at the apparatus over a mobile network;

receiving a protected executable application, wherein the second key decrypts the protected executable application, wherein the protected executable application governs key decryption, and wherein the protected executable application enforces the assigned rights;

decrypting the encrypted first key with the protected second key in accordance with the assigned rights;

decrypting the broadcast segment of encrypted digital content with the decrypted first key;

rendering the digital content; and turning the broadcast receiver back on after a predetermined period.

* * * * *